(12) United States Patent
Van Dingenen et al.

(10) Patent No.: US 11,912,119 B2
(45) Date of Patent: Feb. 27, 2024

(54) DUAL-MOTOR ELECTRICAL TRANSMISSION AND CONTROL METHOD

(71) Applicant: Dana Belgium N.V., Bruges (BE)

(72) Inventors: Joachim Van Dingenen, Drongen (BE); Bert Hannon, Bruges (BE); Kurt Cattoor, Koolkerke (BE); Filip Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 17/341,156

(22) Filed: Jun. 7, 2021

(65) Prior Publication Data
US 2021/0379978 A1    Dec. 9, 2021

(30) Foreign Application Priority Data

Jun. 8, 2020 (DE) .................... 10 2020 207 169.1

(51) Int. Cl.
| | |
|---|---|
| *F16H 61/688* | (2006.01) |
| *B60K 1/02* | (2006.01) |
| *B60K 25/06* | (2006.01) |
| *B60K 25/00* | (2006.01) |
| *B60K 17/28* | (2006.01) |

(52) U.S. Cl.
CPC .............. *B60K 1/02* (2013.01); *B60K 17/28* (2013.01); *B60K 25/06* (2013.01); *F16H 61/688* (2013.01); *B60K 2025/005* (2013.01)

(58) Field of Classification Search
CPC .... B60K 1/02; B60K 25/06; B60K 2025/005; F16H 61/688

USPC ........................................................ 74/661
See application file for complete search history.

(56) References Cited

U.S. PATENT DOCUMENTS

| | | | |
|---|---|---|---|
| 6,712,734 B1 * | 3/2004 | Loeffler ................... | B60K 6/36 |
| | | | 903/909 |
| 7,125,362 B2 | 10/2006 | Beaty et al. | |
| 8,257,213 B2 | 9/2012 | Komada et al. | |
| 9,260,109 B2 * | 2/2016 | Tanaka .................. | F16H 61/688 |
| 11,486,471 B2 * | 11/2022 | Kim ...................... | F16H 37/046 |
| 2005/0119805 A1 * | 6/2005 | Bischoff ............... | B60W 10/06 |
| | | | 903/945 |
| 2016/0167639 A1 * | 6/2016 | Hori ........................ | B60L 50/51 |
| | | | 903/906 |
| 2017/0282700 A1 * | 10/2017 | Bergquist .............. | F16H 37/046 |

* cited by examiner

*Primary Examiner* — Ha Dinh Ho
(74) *Attorney, Agent, or Firm* — McCoy Russell LLP

(57) ABSTRACT

A dual-motor transmission therefor, comprising a first and a second electric traction motor, a first gear arrangement, a second gear arrangement, and a summation box. The first gear arrangement includes a shaft and at least a first gear and a second gear, wherein each of the first and the second gears can be selectively engaged and disengaged with the shaft via a clutch, and the first gear arrangement supplies a first torque from the first motor to the summation box. The second gear arrangement includes a shaft and at least a first gear, wherein the first gear can be engaged and disengaged with the shaft via a clutch, and the second gear arrangement supplies a second torque from the second motor to the summation box, and the summation box is configured to combine the first and second torques and to output a combined output torque.

19 Claims, 4 Drawing Sheets

DUAL-MOTOR ELECTRICAL TRANSMISSION AND CONTROL METHOD

CROSS-REFERENCE TO RELATED APPLICATION

The present application claims priority to German Patent Application No. 10 2020 207 169.1, entitled "DUAL-MOTOR ELECTRICAL TRANSMISSION AND CONTROL METHOD," and filed on Jun. 8, 2020. The entire contents of the above-listed application are hereby incorporated by reference for all purposes.

TECHNICAL FIELD

The present disclosure relates to a dual-motor electrical transmission for an electrical vehicle and a control method for controlling the dual-motor electrical transmission.

BACKGROUND AND SUMMARY

A main objective in improving drive units of electrical vehicles is to improve the efficiency of electric transmissions. In order to operate electric motors at an optimal efficiency, multiple gear ratios towards the transmission output are required. For optimal performance also powershifting is required. Powershifting enables to perform gear shifts without a drop in the output torque function. Powershifting as well as a functionally safe design is desired especially in the off-highway market or other high performance applications.

It is therefore an object of the present disclosure to provide a dual-motor electrical transmission that has an improved efficiency and a functionally safe design.

The object is achieved by the dual-motor electrical transmission and the control method for a dual-motor electrical transmission according to the present disclosure. Advantages embodiments of the dual-motor electrical transmission are also described.

The dual-motor electrical transmission for an electrical vehicle according to the present disclosure comprises a first and a second electric motor for driving the vehicle, a first gear arrangement, a second gear arrangement, and a summation box, wherein the first gear arrangement comprises a first gear arrangement first shaft and at least a first gear and a second gear, wherein each of the first and the second gears can be selectively engaged and disengaged with the first gear arrangement first shaft via a first or second clutch element, and the first gear arrangement is configured to supply a first torque from the first electric motor via one of the first and second gears to the summation box, the second gear arrangement comprises a second gear arrangement first shaft and at least a second gear arrangement first gear, wherein the second gear arrangement first gear can be engaged and disengaged with the second gear arrangement first shaft via a second gear arrangement first clutch element, and the second gear arrangement is configured to supply a second torque from the second electric motor to the summation box, and the summation box is configured to combine the first and second torques and to output a combined output torque.

By having two electric motors on the input side and a combined output torque on the output side of the transmission it is possible to drive the first and second electric motors basically independently from one another and depending on the respectively connected gear arrangements such that efficiency of the dual-motor electrical transmission is maximized. Furthermore, the transmission according to the present disclosure enables powershifting which means that the combined output torque can be maintained during gear shifting.

According to a most simple configuration of the present disclosure, the second gear arrangement can be a direct drive or a single constant gear ratio.

According to an advantageous embodiment of the present disclosure the first gear arrangement can further comprise a first gear arrangement second shaft and a first gear arrangement fixed gear set, wherein the first gear arrangement first shaft is coupled to the first gear arrangement second shaft via the first gear arrangement fixed gear set.

According to a further advantageous embodiment, the second gear arrangement can further comprise a second gear arrangement second gear which can be engaged or disengaged with the second gear arrangement first shaft via a second gear arrangement second clutch element.

According to a further advantageous embodiment, the second gear arrangement can further comprise a second gear arrangement second shaft and a second gear arrangement fixed gear set, wherein the second gear arrangement first shaft is coupled to the second gear arrangement second shaft via the second gear arrangement fixed gear set.

According to a further advantageous embodiment, the second gear arrangement can further comprise a second gear arrangement second shaft and at least two further gears which are fixedly engaged with the second gear arrangement second shaft, wherein one of the two further gears is meshed with the second gear arrangement first gear of the second gear arrangement first shaft and the other one of the two further gears is coupled to the summation box.

According to a further advantageous embodiment, the clutch elements can be spring-loaded and/or automatically disengaged in the event of loss of actuation. This renders the mechanical system of the transmission functionally safe, meaning that no power can be transferred to the wheels from the electric motors in case the clutches of the first and second gear arrangements are not activated hydraulically, electrically or by other means.

According to a further advantageous embodiment, the clutch element can consist of or comprise a dog clutch or a synchronizer clutch.

According to a further advantageous embodiment, the second electric motor can be connected to a power take-off and/or a charging pump. In such an embodiment, the second electric motor can be selectively decoupled from the summation box to only power the power take off and/or the charging pump.

According to a further advantageous embodiment, the combined output torque can be outputted to a front output yoke and/or a rear output yoke.

According to a further advantageous embodiment a third gear arrangement can be added between the summation box and the rear and front output yokes, wherein the third gear arrangement can comprise two gear sets that can be engaged and disengaged via a third gear arrangement first and second clutch element. These clutch elements can consist of or comprise a wet clutch. Wet clutches enable powershifting.

According to a further advantageous embodiment, between the front output yoke and the rear output yoke an inter-axle differential, optionally including a lock-up function, and/or a disconnect clutch to decouple the front output yoke from the rear output yoke or the rear output yoke from the front output yoke can be arranged. Alternatively, the front and rear output yokes are rigidly connected or connected by other means.

According to a further advantageous embodiment, the dual-motor electrical transmission can comprise a first control unit adapted to control the second electric motor to provide an increased second torque during a gear shifting process in the first gear arrangement such that the combined output torque is basically constant during the gear shifting process.

According to a further advantageous embodiment, the dual-motor electrical transmission can comprise a second control unit adapted to control the first electric motor to provide an increased first torque during a gear shifting process in the second gear arrangement such that the combined output torque is basically constant during the gear shifting process.

The first and second control units may be parts of a common control unit or may be separate members and/or may be connected to a master control unit. The first and second control units can be inverter control units and can be adapted to control the first and second electrical motor, respectively, to realize speed-torque set points provided by the master control unit.

According to a further advantageous embodiment, the increased first or second torque can be a peak torque of the first or second electric motor, wherein the peak torque can be about twice a continuous torque of the first or the second electric motor.

The present disclosure further includes a control method for controlling a dual-motor electrical transmission as described above to perform a gear shift in the first gear arrangement from a first gear to a second gear, comprising: controlling the second electric motor to synchronize with the second gear arrangement first gear, controlling the second gear arrangement first clutch element to engage with the second gear arrangement first shaft, controlling the first electric motor to reduce the first torque to zero, and simultaneously controlling the second electric motor to increase the second torque such that the combined output torque is basically constant, controlling the first clutch element to disengage from the first gear arrangement first shaft, controlling the first electric motor to synchronize with the first gear arrangement second gear, controlling the second clutch element to engage with the first gear arrangement first shaft, controlling the second electric motor to decrease the second torque, and simultaneously controlling the first electric motor to increase the first torque such that the combined output torque is basically constant.

According to an advantageous embodiment of above control method, the gear shifting process in the first gear arrangement can be an upshifting process if the first gear is lower than the second gear.

According to a further advantageous embodiment of above control method, the gear shifting process in the first gear arrangement can be a downshifting process if the first gear is higher than the second gear.

The present disclosure further includes a control method for controlling a dual-motor electrical transmission comprising a second gear arrangement having at least two gears as described above to perform a gear shift in the second gear arrangement from a first gear to a second gear, comprising: controlling the first electric motor to synchronize with the first gear arrangement first gear, controlling the first clutch element to engage with the first gear arrangement first shaft, controlling the second electric motor to reduce the second torque to zero, and simultaneously controlling the first electric motor to increase the first torque such that the combined output torque is basically constant, controlling the first clutch element to disengage from the second gear arrangement first shaft, controlling the second electric motor to synchronize with the second gear arrangement second gear, controlling the second gear arrangement second clutch element to engage with the second gear arrangement first shaft, controlling the first electric motor to decrease the first torque, and simultaneously controlling the second electric motor to increase the second torque such that the combined output torque is basically constant.

According to an advantageous embodiment of above control method, the gear shifting process in the second gear arrangement can be an upshifting process if the second gear arrangement first gear is lower than the second gear arrangement second gear.

According to a further advantageous embodiment of the present disclosure, the gear shifting process in the second gear arrangement can be a downshifting process if the second gear arrangement first gear is higher than the second gear arrangement second gear.

An advantage of the control method according to the present disclosure is that the output torque is a continuous curve without a dip in the torque curve. Although the first gear arrangement is in the most simple configuration a two-speed gear arrangement with dog clutches, the output torque will be maintained during shifting. This is reached by increasing the torque of one electric motor while the other electric motor is synchronizing the open dog clutch at zero power. For a full powershift, electric motors can be selected for which a peak power for the duration of the shift is at least twice the continuous power. Powershifting is needed for many high performance applications, as for off-highway applications. But an electric power train requires high efficiency to reduce the energy storage, for instance battery size. Therefore, high efficient dog clutches may be used.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

In the following, specific embodiments of the dual-motor electrical transmission according to the present disclosure are described in more detail on the basis of the following figures. The described features are not only conceivable in the combinations of the disclosed embodiments, but can be realized independently of the concrete embodiments in various other combinations. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components.

DETAILED DESCRIPTION

Figure 1:
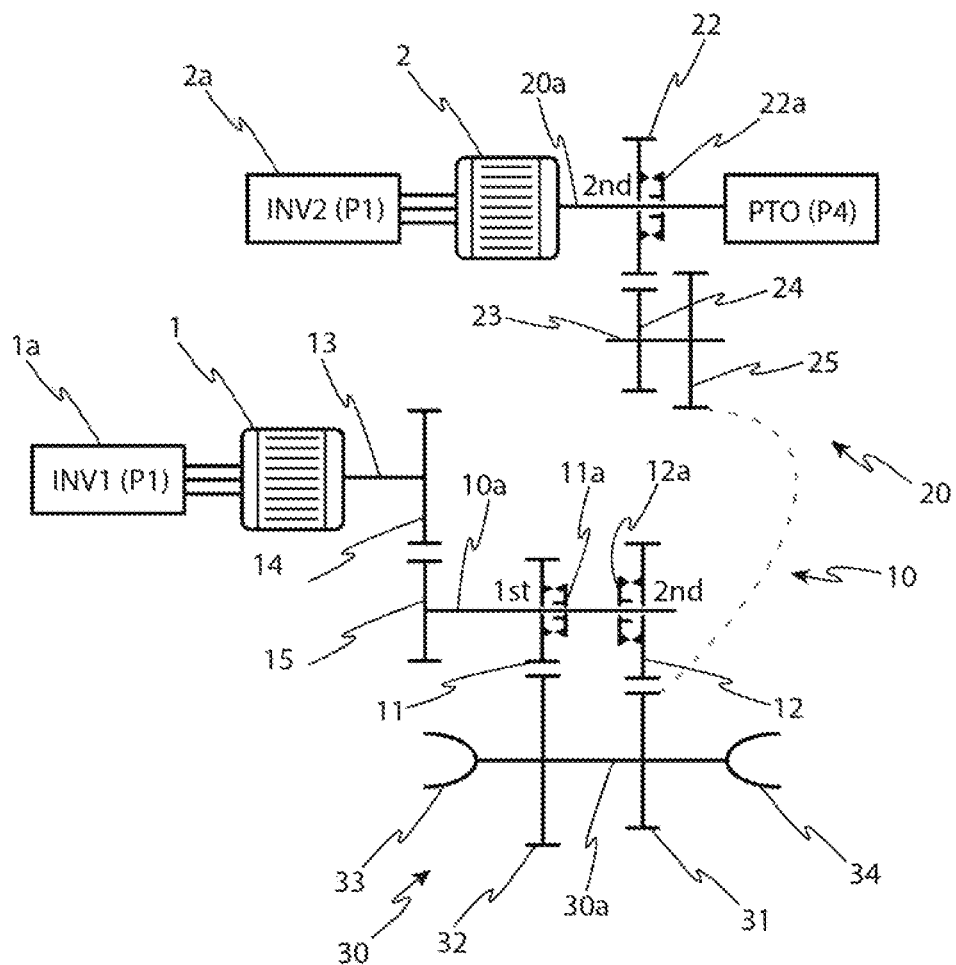
FIG. 1 shows schematically a transmission layout according to a first embodiment of the present disclosure.

FIG. 1 shows schematically a transmission layout according to a first embodiment of the present disclosure. The dual-motor electrical transmission for an electrical vehicle according to the first embodiment comprises a first electrical motor 1, which is controlled by a first inverter controller 1a, and a second electrical motor 2, which is controlled by a second inverter controller 2a. The first and second motors 1, 2 are configured to drive the electrical vehicle. The transmission further comprises a first gear arrangement 10, a second gear arrangement 20 and a summation box 30.

The first gear arrangement 10 comprises a first gear arrangement first shaft 10a, a first gear 11 and a second gear 12, wherein each of the first and the second gears 11, 12 can be selectively engaged and disengaged with the first gear arrangement first shaft 10a via a first or second dog clutch 11a, 12a. The first gear arrangement 10 further comprises a first gear arrangement second shaft 13 and a first gear arrangement fixed gear set with gears 14, 15. Gear 14 is permanently engaged with the first gear arrangement second shaft, gear 15 is permanently engaged with the first gear arrangement first shaft 10a and gears 14, 15 are meshed with one another such that the first gear arrangement first shaft 10a is coupled to the first gear arrangement second shaft 13 via the first gear arrangement fixed gear set 14, 15.

The second gear arrangement 20 comprises a second gear arrangement first shaft 20a and a second gear arrangement first gear 22, wherein the second gear arrangement first gear 22 can be engaged and disengaged with the second gear arrangement first shaft 20a via a second gear arrangement first dog clutch 22a. The second gear arrangement 20 further comprises a second gear arrangement second shaft 23 and two further gears 24, 25 which are fixedly engaged with the second gear arrangement second shaft 23, wherein one of the two further gears 24, 25 is meshed with the second gear arrangement first gear 22 of the second gear arrangement first shaft 20a and the other one of the two further gears 24, 25 is coupled to the summation box 30. In addition, the second gear arrangement first shaft 20a is connected to a power take-off. In the case, the dog clutch 22a is disengaged from the second gear arrangement first shaft 20a, only the power take-off is powered by the second electric motor 2.

The summation box comprises a shaft 30a, a summation box first gear 32 and a summation box second gear 31 which are permanently engaged with the shaft 30a. The shaft 30a is further connected with a front output yoke 34 and a rear output yoke 33. Front and rear output yokes 33 and 34 are configured to deliver the combined output torque to the wheels of the vehicle.

The first gear 11 of the first gear arrangement 10 is meshed with the summation box first gear 32. Each of the second gear 12 of the first gear arrangement 10 and gear 25 of the second gear arrangement 20 are meshed with the summation box second gear 32.

The first gear arrangement 10 is configured to supply a first torque from the first electric motor 1 via one of the first and second gears 11, 12 to the summation box 30. The second gear arrangement 20 is configured to supply a second torque from the second electric motor 2 to the summation box 30. The summation box 30 is configured to combine the first and second torques and to output a combined output torque to the front and rear output yokes 34 and 33.

In this embodiment, the second gear 12a of the first gear arrangement 10 and the second gear arrangement first gear 22 have equal size and form the second gear of the transmission. The first gear 11 of the first gear arrangement is smaller than gears 12a and 22 and forms the first gear of the transmission. In other words, when the transmission is in first gear, only electric motor 1 can drive by engaging the first dog clutch 11a. In the second gear of the transmission, either electric motor 1 by engaging clutch 12a or electric motor 2 by engaging clutch 22a can drive alone or both electric motors 1 and 2 can drive together by engaging both clutches 12a and 22a. Thus, in the second gear of the transmission both motors 1 and 2 can contribute to the output torque, and the load can be divided symmetrically among both motors 1 and 2 in order to increase the performance of the transmission.

Figure 2:
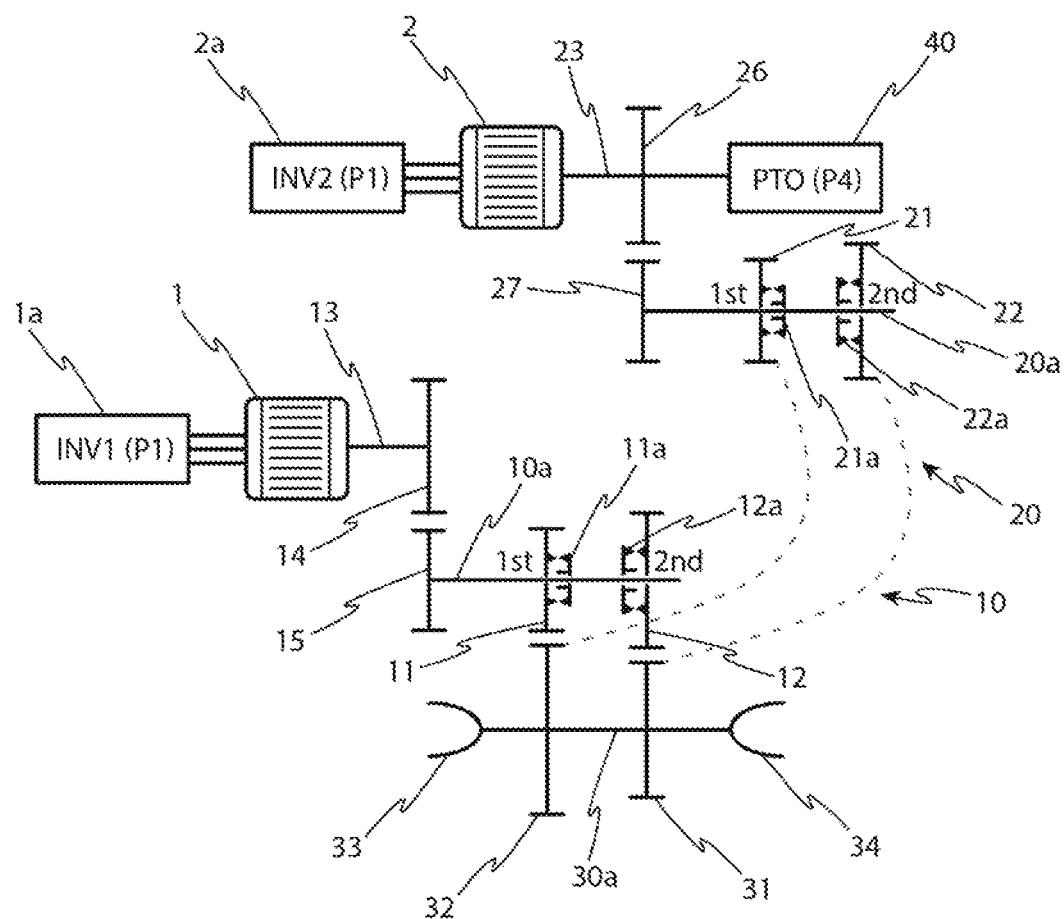
FIG. 2 shows schematically a transmission layout according to a second embodiment of the present disclosure.

FIG. 2 shows schematically a transmission layout according to a second embodiment of the present disclosure. In the second embodiment, the first gear arrangement 10 and the summation box 30 are designed as in the first embodiment. The second embodiment differs from the first embodiment in the design of the second gear arrangement 20. The second gear arrangement 20 of the second embodiment is designed similar to the first gear arrangement 10.

The second gear arrangement 20 comprises a second gear arrangement first shaft 20a and a second gear arrangement first gear 21, wherein the second gear arrangement first gear 21 can be engaged and disengaged with the second gear arrangement first shaft 20a via a second gear arrangement first dog clutch 21a. The second gear arrangement 20 can further comprise a second gear arrangement second gear 22 which can be engaged or disengaged with the second gear arrangement first shaft 20a via a second gear arrangement second dog clutch 22a. The second gear arrangement 20 further comprises a second gear arrangement second shaft 23 and a second gear arrangement fixed gear set with gears 26, 27. Gear 26 is permanently engaged with the second shaft 23, whereas gear 27 is permanently engaged with the first shaft 20a. Gears 26 and 27 are meshed with one another such that the second gear arrangement first shaft 20a is coupled to the second gear arrangement second shaft 23 via the second gear arrangement fixed gear set 26, 27.

Each of the first gear arrangement first gear 11 and the second gear arrangement first gear 21 are meshed with gear 32 of the summation box 30. Moreover, each of the first gear arrangement second gear 21 and the second gear arrangement second gear 22 are meshed with gear 31 of the summation box 30.

In this embodiment, the first gear 11 of the first gear arrangement 10 and the second gear arrangement first gear 21 have equal size and form the first gear of the transmission. The second gear 12a of the first gear arrangement 10 and the second gear arrangement first gear 22 have equal size, are bigger than gears 11 and 21, and form the second gear of the transmission. In other words, either electric motor 1 by engaging clutch 11a or electric motor 2 by engaging clutch 21a can drive alone or both electric motors 1 and 2 can drive together by engaging both clutches 11a and 21a in the first gear of the transmission. And either electric motor 1 by engaging clutch 12a or electric motor 2 by engaging clutch 22a can drive alone or both electric motors 1 and 2 can drive together by engaging both clutches 12a and 22a in the second gear of the transmission. Thus, in the first as well as in the second gear of the transmission both motors 1 and 2 can contribute to the output torque, and the load can be divided symmetrically among both motors 1 and 2 in order to increase the efficiency of the transmission. With both electric motors 1, 2 being configured to drive in first gear, the maximum output torque of the transmission can be increased.

Figure 3:
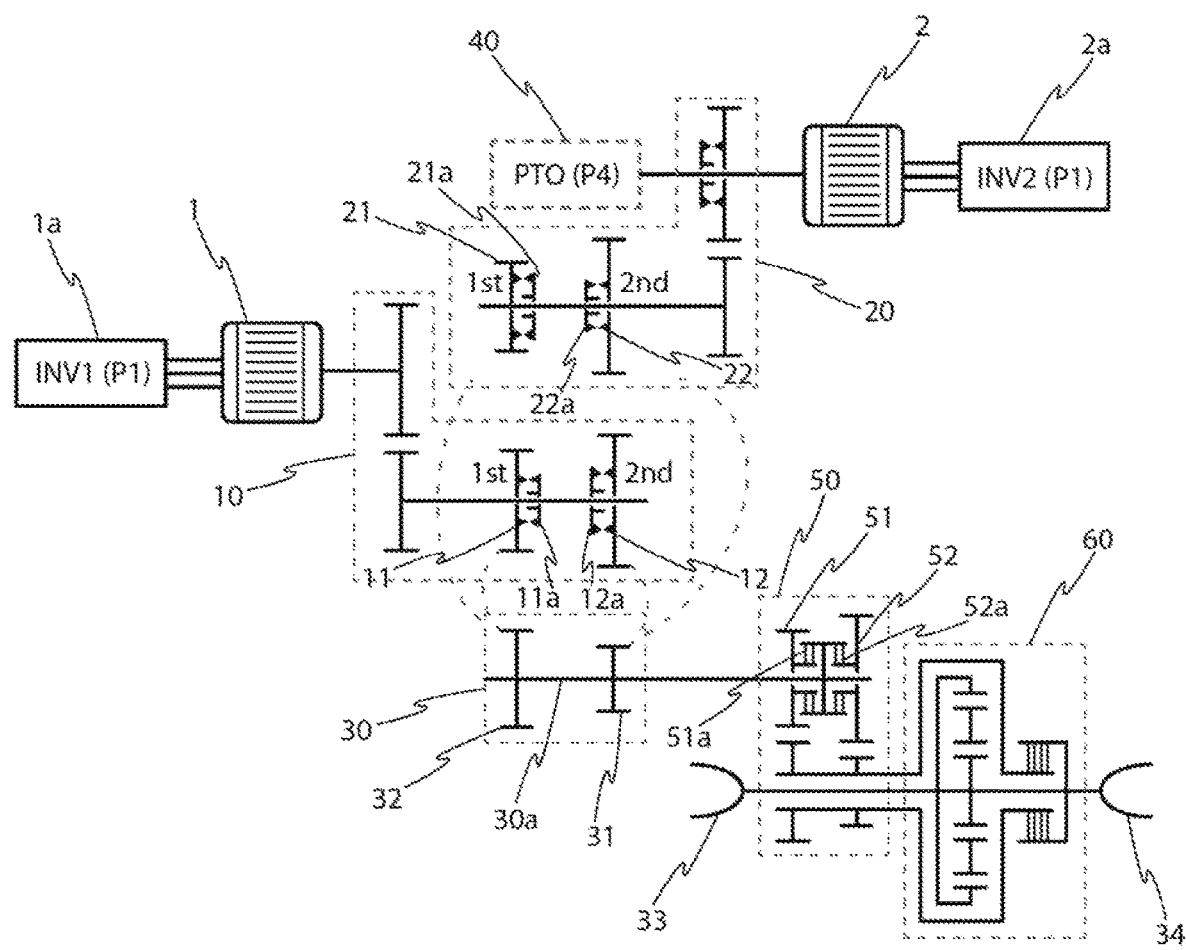
FIG. 3 shows schematically a transmission layout according to a third embodiment of the present disclosure.

FIG. 3 shows schematically a transmission layout according to a third embodiment of the present disclosure. The third embodiment is similar to the second embodiment. However, the third embodiment differs from the second embodiment by including a third gear arrangement 50 connected to the shaft 30a of the summation box 30 and an inter-axle differential 60.

Each of the first gear arrangement first gear 11 and the second gear arrangement first gear 21 are meshed with gear 32 of the summation box 30. Moreover, each of the first gear arrangement second gear 12 and the second gear arrangement second gear 22 are meshed with gear 31 of the summation box 30. In the first to third embodiments, summation box gear 31 is smaller than summation box gear 32.

In this embodiment, the first gear 11 of the first gear arrangement 10 and the second gear arrangement first gear 21 have equal size and form the first gear of the transmission. The second gear 12 of the first gear arrangement 10 and the second gear arrangement second gear 22 have equal size, are bigger than gears 11 and 21, and form the second gear of the transmission. In other words, in the first gear of the transmission, electric motor 1 can drive alone by engaging clutch 11a and via summation box gear 32, or electric motor 2 can drive alone by engaging clutch 21a and via summation box gear 32, or both electric motors 1 and 2 can drive by engaging both clutches 11a and 21a via summation box gear 32. In the second gear of the transmission, electric motor 1 can drive alone by engaging clutch 12a and via summation box gear 31, or electric motor 2 can drive alone by engaging clutch 22a and via summation box gear 31, or both electric motors 1 and 2 can drive by engaging both clutches 12a and 22a via summation box gear 31. Thus, in the first as well as in the second gear of the transmission, both motors 1 and 2 can contribute to the output torque. Due to the coupling to different summation box gears in the first and second gear of the transmission, the load can be divided among both electric motors 1 and 2 which can increase the efficiency of the transmission.

The third gear arrangement is a 2-speed gear arrangement with wet clutches. The two further gears 51, 52 can be selectively engaged and disengaged via the wet clutches 51a, 52a with the shaft 30a of the summation box 30. The gear ratios 51, 52 apply to both electric motors 1, 2. For some applications these additional speed ratios can be useful to reach higher speeds or torques. The wet clutches 51a, 52a allow powershifting in the additional gears 51, 52. Nevertheless, if the application allows some gear shifts to occur with an output torque dip, alternatively also dog clutches or synchronizers or other kind of clutches can be used here. As a further alternative, the third gear arrangement can be one single gear ratio without clutches in a basic configuration.

Via the third gear arrangement 50, the summation box is coupled to an inter-axle differential 60. The inter-axle differential 60 has a lock-up function provided by a wet clutch. Alternatively, other clutches, as for instance a dog clutch, can be selected as well.

In the following, a control method for controlling the dual-motor electric transmission according to the first embodiment to perform a gear shift from a first gear 11 to a second gear 12 in the first gear arrangement 1 without output torque dip is described. The second gear arrangement 2 has only one gear ratio towards the output, while the first gear arrangement 1 has two gear ratios towards the output. The vehicle application allows for one electric motor in first gear and two electric motors in second gear. In the first gear, the first electric motor 1 is used to drive the vehicle, while the second electric motor 2 is off for supplying the power take-off/charging pump power at a sufficient high speed. In second gear the first electric motor 1 and the second electric motor 2 are both driving the vehicle. At the beginning of a gear shifting process the first electric motor 1 is controlled to drive via the first dog clutch 11a. Then, the second electric motor 2 is controlled to synchronize with the second gear arrangement first gear 22. Then, the second gear arrangement first dog clutch 22a is controlled to engage with the second gear arrangement first shaft 20a. Then, the first electric motor 1 is controlled to reduce the first torque to zero, and simultaneously the second electric motor 2 is controlled to increase the second torque such that the combined output torque is basically constant. Then, the first dog clutch 11a is controlled to disengage from the first gear arrangement first shaft 10a. Then, the first electric motor 1 is controlled to synchronize with the first gear arrangement second gear 12. Then, the second dog clutch 12a is controlled to engage with the first gear arrangement first shaft 10a. Then, the second electric motor 2 is controlled to decrease the second torque, and simultaneously the first electric motor 1 is controlled to increase the first torque such that the combined output torque is basically constant.

Figure 4:
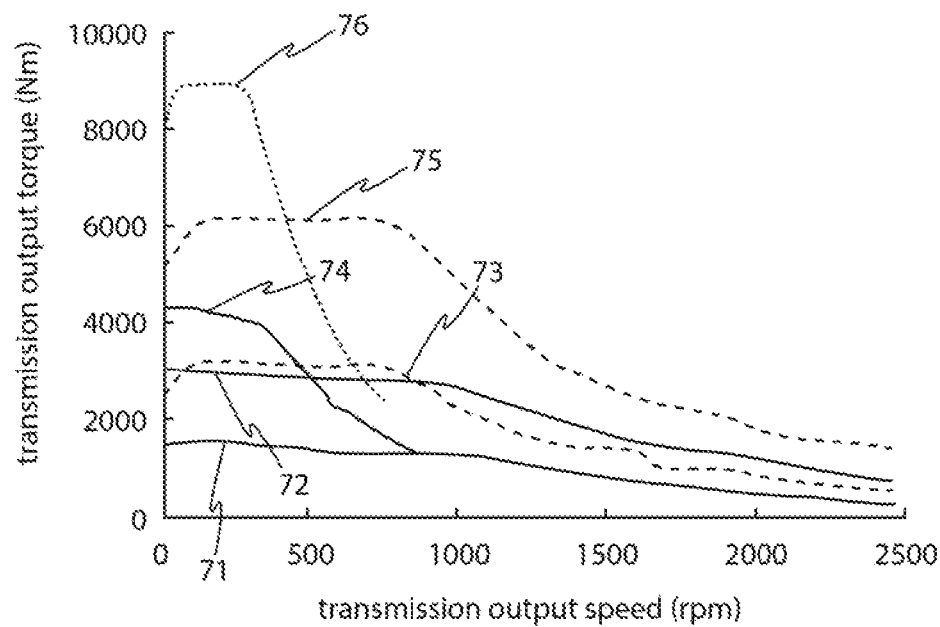
FIG. 4 shows different transmission output torque curves depending on the transmission output speed.
Figure 5:
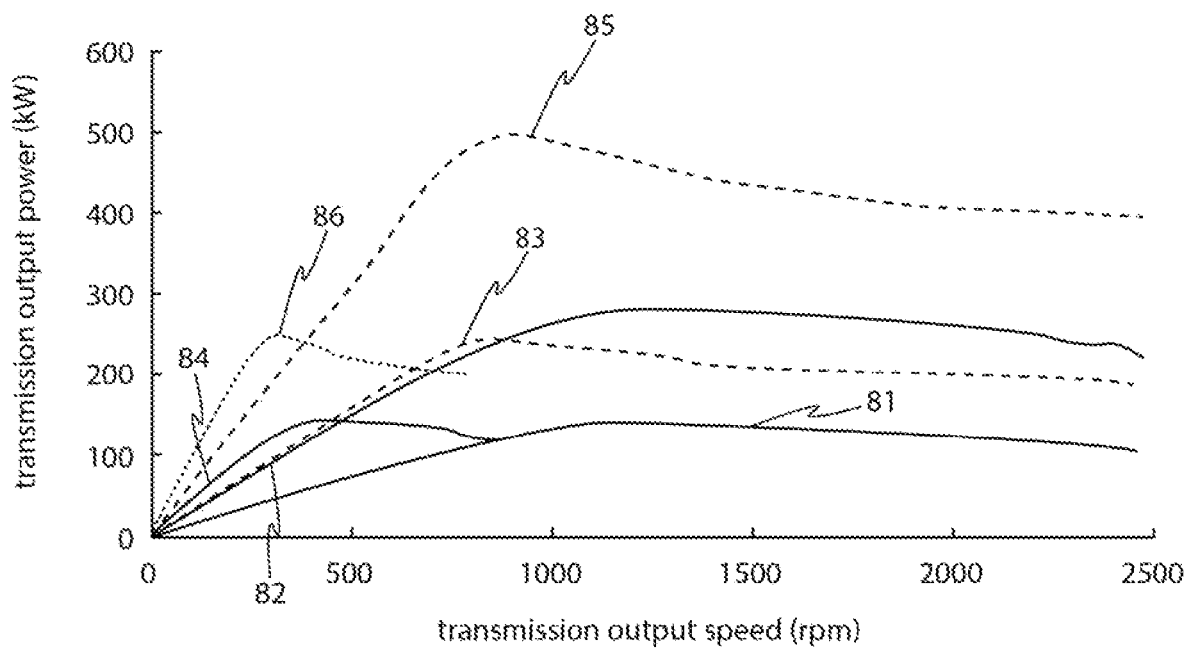
FIG. 5 shows different transmission output power curves depending on the transmission output speed.

FIG. 4 shows different transmission output torque curves depending on the transmission output speed. The continuous curves 71, 72 and 74 represent continuous torque of one electric motor in second gear, two electric motors in second gear and one electric motor in first gear, respectively. The dotted curves 73, 75, 76 represent peak torque of one electric motor in second gear, two electric motors in second gear and one electric motor in first gear, respectively. FIG. 5 shows different transmission output power curves depending on the transmission output speed. The continuous curves 81, 82 and 84 represent continuous power of one electric motor in second gear, two electric motors in second gear and one electric motor in first gear, respectively. The dotted curves 83, 85 and 86 represent peak power of one electric motor in second gear, two electric motors in second gear and one electric motor in first gear, respectively. The first gear continuous torque is represented by the continuous curve 74, the second gear continuous torque is represented by the continuous curve 72. During shifting the torque of one electric motor is increased to compensate the zero torque of the other electric motor. This is represented by the dotted curve 73. As the dotted curve 73 lies above the curve 74 and the curve 72 in the shifting zone, no torque dip is observed during shifting. Hence, the output torque towards the wheels is maintained across the whole vehicle speed range without torque dip. In other words, gear changes are performed by powershifting.

For functional safety reasons, an automatic shift to neutral is required in case of unsafe vehicle conditions. Although normally-open clutches for the first and second gear arrangements 10 and 20 may be dog clutches, other technologies may be used. One example are spring-loaded synchronizer clutches. An advantage of using synchronizer clutches is that the electric motor synchronization can be less accurate which simplifies the electric motor control.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A dual-motor electrical transmission for an electrical vehicle, the transmission comprising:
   a first and a second electric motor for driving the vehicle;
   a first gear arrangement, a second gear arrangement, a summation box, and a control unit, wherein
   the first gear arrangement comprises a first gear arrangement first shaft and at least a first gear and a second gear, wherein each of the first and the second gears can be selectively engaged and disengaged with the first gear arrangement first shaft via a first and second clutch element, and the first gear arrangement is configured to supply a first torque from the first electric motor via one of the first and second gears to the summation box;
   the second gear arrangement comprises a second gear arrangement first shaft and at least a second gear arrangement first gear, wherein the second gear arrangement first gear can be engaged and disengaged with the second gear arrangement first shaft via a second gear arrangement first clutch element, and the second gear arrangement is configured to supply a second torque from the second electric motor to the summation box;
   the summation box is configured to combine the first and second torques and to output a combined output torque; and
   the control unit is configured to control the second electric motor to provide an increased second torque during a gear shifting process in the first gear arrangement such that the combined output torque is basically constant during the gear shifting process.

2. The dual-motor electrical transmission according to claim 1, wherein the first gear arrangement further comprises a first gear arrangement second shaft and a first gear arrangement fixed gear set, wherein the first gear arrangement first shaft is coupled to the first gear arrangement second shaft via the first gear arrangement fixed gear set.

3. The dual-motor electrical transmission according to claim 1, wherein the second gear arrangement further comprises a second gear arrangement second gear which can be engaged or disengaged with the second gear arrangement first shaft via a second gear arrangement second clutch element.

4. The dual-motor electrical transmission according to claim 1, wherein the second gear arrangement further comprises a second gear arrangement second shaft and a second gear arrangement fixed gear set, wherein the second gear arrangement first shaft is coupled to the second gear arrangement second shaft via the second gear arrangement fixed gear set.

5. The dual-motor electrical transmission according to claim 1, wherein the clutch elements are spring-loaded and/or automatically disengaged in the event of loss of actuation.

6. The dual-motor electrical transmission according to claim 1, wherein the clutch element comprises a dog clutch or a synchronizer clutch.

7. The dual-motor electrical transmission according to claim 1, wherein the second electric motor is connected to a power take-off and/or a charging pump.

8. The dual-motor electrical transmission according to claim 1, wherein the second gear of the first gear arrangement and the second gear arrangement first gear have equal size and, when selectively engaged with the first gear arrangement first shaft and the second gear arrangement first shaft, respectively, permit both the first and the second electric motor to contribute to the combined output torque.

9. The dual-motor electrical transmission according to claim 3, wherein the first gear of the first gear arrangement and the second gear arrangement first gear have equal size and, when selectively engaged with the first gear arrangement first shaft and the second gear arrangement first shaft, respectively, form a first transmission gear permitting both the first and the second electric motor to contribute to the combined output torque.

10. The dual-motor electrical transmission according to claim 9, wherein the second gear of the first gear arrangement and the second gear arrangement second gear have equal size, are larger than the first gear of the first gear arrangement and the second gear arrangement first gear, and, when selectively engaged with the first gear arrangement first shaft and the second gear arrangement first shaft, respectively, form a second transmission gear permitting both the first and the second electric motor to contribute to the combined output torque.

11. The dual-motor electrical transmission according to claim 10, wherein engaging and/or disengaging clutch elements permits one or both of the first electric motor and the second electric motor to contribute to the combined output torque in either the first transmission gear or the second transmission gear.

12. The dual-motor electrical transmission according to claim 3, further comprising a third gear arrangement connected to a summation box shaft of the summation box.

13. The dual-motor electrical transmission according to claim 12, further comprising an inter-axle differential coupled to the third gear arrangement.

14. The dual-motor electrical transmission according to claim 12, wherein the third gear arrangement is a two-speed gear arrangement having a third gear arrangement first gear and a third gear arrangement second gear.

15. The dual-motor electrical transmission according to claim 14, wherein the third gear arrangement first gear and the third gear arrangement second gear are selectively engaged and disengaged with the summation box shaft via third gear arrangement first and second clutch elements, respectively.

16. The dual-motor electrical transmission according to claim 13, wherein each of the third gear arrangement first and second clutch elements comprises a wet clutch.

17. A dual-motor electrical transmission for an electrical vehicle, the transmission comprising:
a first and a second electric motor for driving the vehicle;
a first gear arrangement, a second gear arrangement, and a summation box, wherein
the first gear arrangement comprises a first gear arrangement first shaft and at least a first gear and a second gear, wherein each of the first and the second gears can be selectively engaged and disengaged with the first gear arrangement first shaft via a first and second clutch element, and the first gear arrangement is configured to supply a first torque from the first electric motor via one of the first and second gears to the summation box;
the second gear arrangement comprises a second gear arrangement first shaft and at least a second gear arrangement first gear, wherein the second gear arrangement first gear can be engaged and disengaged with the second gear arrangement first shaft via a second gear arrangement first clutch element, and the second gear arrangement is configured to supply a second torque from the second electric motor to the summation box, and the second gear arrangement includes a second gear arrangement second shaft and at least two further gears which are fixedly engaged with the second gear arrangement second shaft, wherein one of the two further gears is meshed with the second gear arrangement first gear of the second gear arrangement first shaft and the other one of the two further gears is coupled to the summation box; and
the summation box is configured to combine the first and second torques and to output a combined output torque.

18. A control method for controlling a dual-motor transmission of an electric vehicle to perform a gear shift in a first gear arrangement from a first gear to a second gear, the transmission comprising:
a first and a second electric motor for driving the vehicle;
the first gear arrangement, a second gear arrangement, and a summation box, wherein
the first gear arrangement comprises a first gear arrangement first shaft and at least the first gear and the second gear, wherein each of the first and the second gears can be selectively engaged and disengaged with the first gear arrangement first shaft via a first and second clutch element, and the first gear arrangement is configured to supply a first torque from the first electric motor via one of the first and second gears to the summation box;
the second gear arrangement comprises a second gear arrangement first shaft and at least a second gear arrangement first gear, wherein the second gear arrangement first gear can be engaged and disengaged with the second gear arrangement first shaft via a second gear arrangement first clutch element, and the second gear arrangement is configured to supply a second torque from the second electric motor to the summation box; and
the summation box is configured to combine the first and second torques and to output a combined output torque,
the method comprising:
controlling the second electric motor to synchronize with the second gear arrangement first gear,
controlling the second gear arrangement first clutch element to engage with the second gear arrangement first shaft,
controlling the first electric motor to reduce the first torque to zero, and simultaneously controlling the second electric motor to increase the second torque such that the combined output torque is constant,
controlling the first clutch element to disengage from the first gear arrangement first shaft,
controlling the first electric motor to synchronize with the first gear arrangement second gear,
controlling the second clutch element to engage with the first gear arrangement first shaft,
controlling the second electric motor to decrease the second torque, and simultaneously controlling the first electric motor to increase the first torque such that the combined output torque is constant.

19. A control method for controlling a dual-motor electrical transmission for an electric vehicle to perform a gear shift in a second gear arrangement from a first gear to a second gear, the transmission comprising:
a first and a second electric motor for driving the vehicle;
a first gear arrangement, the second gear arrangement, and a summation box, wherein
the first gear arrangement comprises a first gear arrangement first shaft and at least the first gear and the second gear, wherein each of the first and the second gears can be selectively engaged and disengaged with the first gear arrangement first shaft via a first and second clutch element, and the first gear arrangement is configured to supply a first torque from the first electric motor via one of the first and second gears to the summation box;
the second gear arrangement comprises a second gear arrangement first shaft and at least a second gear arrangement first gear, wherein the second gear arrangement first gear can be engaged and disengaged with the second gear arrangement first shaft via a second gear arrangement first clutch element, the second gear arrangement is configured to supply a second torque from the second electric motor to the summation box, and the second gear arrangement includes a second gear arrangement second gear which can be engaged or disengaged with the second gear arrangement first shaft via a second gear arrangement second clutch element; and
the summation box is configured to combine the first and second torques and to output a combined output torque,
the method comprising:
controlling the first electric motor to synchronize with the first gear arrangement first gear, controlling the first clutch element to engage with the first gear arrangement first shaft, controlling the second electric motor to reduce the second torque to zero, and simultaneously controlling the first electric motor to increase the first torque such that the combined output torque is constant, controlling the first clutch element to disengage from the second gear arrangement first shaft, controlling the second electric motor to synchronize with the second gear arrangement second gear, controlling the second gear arrangement second clutch element to engage with the second gear arrangement first shaft, controlling the first electric motor to decrease the first torque, and simultaneously controlling the second electric motor to increase the second torque such that the combined output torque is constant.

* * * * *